(12) United States Patent
Pervan

(10) Patent No.: US 8,387,327 B2
(45) Date of Patent: Mar. 5, 2013

(54) MECHANICAL LOCKING SYSTEM FOR FLOOR PANELS

(75) Inventor: Darko Pervan, Viken (SE)

(73) Assignee: Valinge Innovation AB, Viken (SE)

( * ) Notice: Subject to any disclaimer, the term of this patent is extended or adjusted under 35 U.S.C. 154(b) by 0 days.

(21) Appl. No.: 13/253,283

(22) Filed: Oct. 5, 2011

(65) Prior Publication Data

US 2012/0036804 A1 Feb. 16, 2012

Related U.S. Application Data

(63) Continuation of application No. 12/962,341, filed on Dec. 7, 2010, now Pat. No. 8,079,196, which is a continuation of application No. 11/822,723, filed on Jul. 9, 2007, now Pat. No. 7,866,110, which is a continuation of application No. 11/092,748, filed on Mar. 30, 2005, now Pat. No. 7,841,144.

(51) Int. Cl.
*E04B 2/00* (2006.01)

(52) U.S. Cl. ....... 52/586.2; 52/578; 52/586.1; 52/592.1; 52/591.1; 52/592.4; 52/582.2; 52/585.1; 403/291; 403/316

(58) Field of Classification Search .......... 52/590.2, 52/592.1, 591.1, 592.3, 592.4, 578, 582.1, 52/582.2, 586.1, 585.1, 586.2; 403/291, 403/315, 316, 319; 292/1, 300, DIG. 38, 292/DIG. 53

See application file for complete search history.

(56) References Cited

U.S. PATENT DOCUMENTS

| | | | |
|---|---|---|---|
| 124,228 A | 3/1872 | Stuart | |
| 1,723,306 A | 8/1929 | Sipe | |
| 1,743,492 A | 1/1930 | Sipe | |
| 1,787,027 A | 12/1930 | Wasleff | |
| 1,809,393 A | 6/1932 | Rockwell | |
| 1,902,716 A | 3/1933 | Newton | |
| 1,925,070 A | 8/1933 | Livezey | |
| 1,995,264 A | 3/1935 | Mason | |
| 2,015,813 A | 10/1935 | Nielsen | |
| 2,026,511 A | 12/1935 | Storm | |
| 2,088,238 A | 7/1937 | Greenway | |
| 2,089,075 A | 8/1937 | Siebs | |
| 2,204,675 A | 6/1940 | Grunert | |
| 2,277,758 A | 3/1942 | Hawkins | |
| 2,303,745 A | 12/1942 | Karreman | |
| 2,430,200 A | 11/1947 | Wilson | |
| 2,596,280 A | 5/1952 | Nystrom | |
| 2,732,706 A | 1/1956 | Friedman | |
| 2,740,167 A | 4/1956 | Rowley | |
| 2,863,185 A | 12/1958 | Riedi | |
| 2,865,058 A | 12/1958 | Andersson | |
| 2,889,016 A | 6/1959 | Warren | |
| 3,023,681 A | 3/1962 | Worsen | |
| 3,077,703 A | 2/1963 | Bergstrom | |
| 3,259,417 A | 7/1966 | Chapman | |

(Continued)

FOREIGN PATENT DOCUMENTS

| CA | 991373 | 6/1976 |
|---|---|---|
| CA | 2456513 | 2/2003 |

(Continued)

OTHER PUBLICATIONS

Pervan, Darko, et al., U.S. Appl. No. 13/426,115, entitled "Mechanical Locking System for Floor Panels," filed in the U. S. Patent and Trademark Office on Mar. 21, 2012.

(Continued)

*Primary Examiner* — Robert Canfield
*Assistant Examiner* — Matthew Gitlin
(74) *Attorney, Agent, or Firm* — Buchanan Ingersoll & Rooney

(57) ABSTRACT

Floor panels (1, 1') are shown, which are provided with a mechanical locking system consisting of a flexible locking element 15 in a locking groove 14 which during a horizontal motion is displaced vertically.

16 Claims, 11 Drawing Sheets

U.S. PATENT DOCUMENTS

| | | |
|---|---|---|
| 3,271,787 A | 9/1966 | Clary |
| 3,325,585 A | 6/1967 | Brenneman |
| 3,378,958 A | 4/1968 | Parks |
| 3,396,640 A | 8/1968 | Fujihara |
| 3,436,888 A | 4/1969 | Ottosson |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,554,850 A | 1/1971 | Kuhle |
| 3,572,224 A | 3/1971 | Perry |
| 3,579,941 A | 5/1971 | Tibbals |
| 3,720,027 A | 3/1973 | Christensen |
| 3,722,379 A | 3/1973 | Koester |
| 3,731,445 A | 5/1973 | Hoffmann et al. |
| 3,742,669 A | 7/1973 | Mansfeld |
| 3,760,547 A | 9/1973 | Brenneman |
| 3,760,548 A | 9/1973 | Sauer et al. |
| 3,778,954 A | 12/1973 | Meserole |
| 3,849,235 A | 11/1974 | Gwynne |
| 3,919,820 A | 11/1975 | Green |
| 3,950,915 A | 4/1976 | Cole |
| 4,007,994 A | 2/1977 | Brown |
| 4,030,852 A | 6/1977 | Hein |
| 4,064,571 A | 12/1977 | Phipps |
| 4,080,086 A | 3/1978 | Watson |
| 4,082,129 A | 4/1978 | Morelock |
| 4,100,710 A | 7/1978 | Kowallik |
| 4,107,892 A | 8/1978 | Bellem |
| 4,113,399 A | 9/1978 | Hansen, Sr. |
| 4,169,688 A | 10/1979 | Toshio |
| 4,196,554 A | 4/1980 | Anderson et al. |
| 4,299,070 A | 11/1981 | Oltmanns et al. |
| 4,304,083 A | 12/1981 | Anderson |
| 4,426,820 A | 1/1984 | Terbrack et al. |
| 4,512,131 A | 4/1985 | Laramore |
| 4,599,841 A | 7/1986 | Haid |
| 4,819,932 A | 4/1989 | Trotter, Jr. |
| 4,944,514 A | 7/1990 | Suiter |
| 5,007,222 A | 4/1991 | Raymond |
| 5,071,282 A | 12/1991 | Brown |
| 5,135,597 A | 8/1992 | Barker |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,295,341 A | 3/1994 | Kajiwara |
| 5,344,700 A | 9/1994 | McGath et al. |
| 5,348,778 A | 9/1994 | Knipp et al. |
| 5,349,796 A | 9/1994 | Meyerson |
| 5,465,546 A | 11/1995 | Buse |
| 5,548,937 A | 8/1996 | Shimonohara |
| 5,598,682 A | 2/1997 | Haughian |
| 5,618,602 A | 4/1997 | Nelson |
| 5,634,309 A | 6/1997 | Polen |
| 5,658,086 A | 8/1997 | Brokaw et al. |
| 5,694,730 A | 12/1997 | Del Rincon et al. |
| 5,755,068 A | 5/1998 | Ormiston |
| 5,899,038 A | 5/1999 | Stroppiana |
| 5,950,389 A | 9/1999 | Porter |
| 6,006,486 A | 12/1999 | Moriau |
| 6,029,416 A | 2/2000 | Andersson |
| 6,052,960 A | 4/2000 | Yonemura |
| 6,065,262 A | 5/2000 | Motta |
| 6,173,548 B1 | 1/2001 | Hamar et al. |
| 6,182,410 B1 | 2/2001 | Pervan |
| 6,203,653 B1 | 3/2001 | Seidner |
| 6,216,409 B1 | 4/2001 | Roy et al. |
| 6,254,301 B1 | 7/2001 | Hatch |
| 6,295,779 B1 | 10/2001 | Canfield |
| 6,314,701 B1 | 11/2001 | Meyerson |
| 6,358,352 B1 | 3/2002 | Schmidt |
| 6,363,677 B1 | 4/2002 | Chen et al. |
| 6,385,936 B1 | 5/2002 | Schneider |
| 6,418,683 B1 | 7/2002 | Martensson et al. |
| 6,446,413 B1 | 9/2002 | Gruber |
| 6,450,235 B1 | 9/2002 | Lee |
| 6,490,836 B1 | 12/2002 | Moriau |
| 6,505,452 B1 | 1/2003 | Hannig |
| 6,536,178 B1 | 3/2003 | Pålsson et al. |
| 6,553,724 B1 | 4/2003 | Bigler |
| 6,576,079 B1 | 6/2003 | Kai |
| 6,591,568 B1 | 7/2003 | Pålsson |
| 6,601,359 B2 | 8/2003 | Olofsson |
| 6,617,009 B1 | 9/2003 | Chen et al. |
| 6,647,689 B2 | 11/2003 | Pletzer |
| 6,647,690 B1 | 11/2003 | Martensson |
| 6,651,400 B1 | 11/2003 | Murphy |
| 6,670,019 B2 | 12/2003 | Andersson |
| 6,681,820 B2 | 1/2004 | Olofsson |
| 6,695,944 B2 | 2/2004 | Courtney |
| 6,729,091 B1 | 5/2004 | Martensson |
| 6,763,643 B1 | 7/2004 | Martensson |
| 6,769,219 B2 | 8/2004 | Schwitte et al. |
| 6,769,835 B2 | 8/2004 | Stridsman |
| 6,797,642 B1 | 9/2004 | Chu et al. |
| 6,802,166 B1 | 10/2004 | Gerhard |
| 6,804,926 B1 | 10/2004 | Eisermann |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |
| 6,898,911 B2 | 5/2005 | Kornfalt et al. |
| 6,922,965 B2 | 8/2005 | Rosenthal et al. |
| 6,948,716 B2 | 9/2005 | Drouin |
| 6,955,020 B2 | 10/2005 | Moriau et al. |
| 6,966,963 B2 | 11/2005 | O'Connor |
| 7,021,019 B2 | 4/2006 | Knauseder |
| 7,040,068 B2 | 5/2006 | Moriau et al. |
| 7,051,486 B2 | 5/2006 | Pervan |
| 7,121,058 B2 | 10/2006 | Palsson et al. |
| 7,152,383 B1 | 12/2006 | Wilkinson et al. |
| 7,188,456 B2 | 3/2007 | Knauseder |
| 7,219,392 B2 | 5/2007 | Mullet et al. |
| 7,251,916 B2 | 8/2007 | Konzelmann et al. |
| 7,275,350 B2 | 10/2007 | Pervan |
| 7,337,588 B1 | 3/2008 | Moebus |
| 7,377,081 B2 | 5/2008 | Ruhdorfer |
| 7,451,578 B2 | 11/2008 | Hannig |
| 7,454,875 B2 | 11/2008 | Pervan |
| 7,516,588 B2 | 4/2009 | Pervan |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan |
| 7,637,068 B2 | 12/2009 | Pervan |
| 7,677,005 B2 | 3/2010 | Pervan |
| 7,721,503 B2 | 5/2010 | Pervan |
| 7,757,452 B2 | 7/2010 | Pervan |
| 7,802,411 B2 | 9/2010 | Pervan et al. |
| 7,806,624 B2 | 10/2010 | McLean et al. |
| 7,841,144 B2 | 11/2010 | Pervan |
| 7,841,145 B2 | 11/2010 | Pervan |
| 7,856,785 B2 | 12/2010 | Pervan |
| 7,861,482 B2 | 1/2011 | Pervan et al. |
| 7,866,110 B2 | 1/2011 | Pervan |
| 7,886,497 B2 | 2/2011 | Pervan |
| 7,908,815 B2 | 3/2011 | Pervan |
| 7,980,041 B2 | 7/2011 | Pervan et al. |
| 8,033,074 B2 | 10/2011 | Pervan et al. |
| 8,033,075 B2 | 10/2011 | Pervan |
| 8,042,311 B2 | 10/2011 | Pervan |
| 8,112,967 B2 | 2/2012 | Pervan et al. |
| 2002/0007608 A1 | 1/2002 | Pervan |
| 2002/0007609 A1 | 1/2002 | Pervan |
| 2002/0031646 A1 | 3/2002 | Chen et al. |
| 2002/0046433 A1 | 4/2002 | Sellman, Jr. et al. |
| 2002/0056245 A1 | 5/2002 | Thiers |
| 2002/0083673 A1 | 7/2002 | Kettler et al. |
| 2002/0092263 A1 | 7/2002 | Schulte |
| 2002/0170259 A1 | 11/2002 | Ferris |
| 2002/0178674 A1 | 12/2002 | Pervan |

| | | | | | | |
|---|---|---|---|---|---|---|
| 2002/0178680 A1 | 12/2002 | Martensson et al. | DE | 199 58 225 A1 | 6/2001 | |
| 2003/0009971 A1 | 1/2003 | Palmberg | DE | 103 16 695 A1 | 10/2004 | |
| 2003/0024199 A1 | 2/2003 | Pervan | DE | 10 2004 055 951 A1 | 7/2005 | |
| 2003/0037504 A1 | 2/2003 | Schwitte et al. | DE | 10 2004 001 363 A1 | 8/2005 | |
| 2003/0094230 A1 | 5/2003 | Sjöberg | DE | 10 2005 024 366 A1 | 11/2006 | |
| 2003/0101681 A1 | 6/2003 | Tychsen | DE | 10 2006 024 184 A1 | 11/2007 | |
| 2003/0154676 A1 | 8/2003 | Schwartz | EP | 0 013 852 A1 | 8/1980 | |
| 2003/0180091 A1 | 9/2003 | Stridsman | EP | 0 652 340 | 5/1995 | |
| 2003/0188504 A1 | 10/2003 | Ralf | EP | 0 974 713 A1 | 1/2000 | |
| 2003/0196405 A1 | 10/2003 | Pervan | EP | 1 120 515 A1 | 8/2001 | |
| 2004/0031227 A1 | 2/2004 | Knauseder | EP | 1 146 182 A2 | 10/2001 | |
| 2004/0049999 A1 | 3/2004 | Krieger | EP | 1 308 577 A2 | 5/2003 | |
| 2004/0060255 A1 | 4/2004 | Knauseder | EP | 1 350 904 A3 | 10/2003 | |
| 2004/0068954 A1 | 4/2004 | Martensson | EP | 1 420 125 A2 | 5/2004 | |
| 2004/0107659 A1 | 6/2004 | Glockl | EP | 1 640 530 A2 | 3/2006 | |
| 2004/0123548 A1 | 7/2004 | Gimpel et al. | EP | 1 650 375 A1 | 4/2006 | |
| 2004/0128934 A1 | 7/2004 | Hecht | EP | 1 650 375 A8 | 9/2006 | |
| 2004/0139678 A1 | 7/2004 | Pervan | FR | 1 138 595 | 6/1957 | |
| 2004/0168392 A1 | 9/2004 | Konzelmann et al. | FR | 2 256 807 | 8/1975 | |
| 2004/0177584 A1 | 9/2004 | Pervan | FR | 2 810 060 A1 | 12/2001 | |
| 2004/0182036 A1 | 9/2004 | Sjoberg et al. | GB | 2 051 916 A | 1/1981 | |
| 2004/0200175 A1 | 10/2004 | Weber | JP | 3-110258 A | 5/1991 | |
| 2004/0211143 A1 | 10/2004 | Hanning | JP | 05018028 | 1/1993 | |
| 2004/0211144 A1 | 10/2004 | Stanchfield | JP | 6-146553 A | 5/1994 | |
| 2004/0261348 A1 | 12/2004 | Vulin | JP | 6-288017 A | 10/1994 | |
| 2005/0160694 A1 | 7/2005 | Pervan | JP | 6-306961 A | 11/1994 | |
| 2005/0166514 A1 | 8/2005 | Pervan | JP | 6-322848 A | 11/1994 | |
| 2005/0210810 A1 | 9/2005 | Pervan | JP | 7310426 | 11/1995 | |
| 2005/0235593 A1 | 10/2005 | Hecht | JP | 10219975 | 8/1998 | |
| 2005/0252130 A1 | 11/2005 | Martensson | WO | WO 94/26999 | 11/1994 | |
| 2006/0032168 A1 | 2/2006 | Thiers | WO | WO 96/27719 | 9/1996 | |
| 2006/0070333 A1 | 4/2006 | Pervan | WO | WO 96/27721 | 9/1996 | |
| 2006/0101769 A1 | 5/2006 | Pervan et al. | WO | WO 97/47834 | 12/1997 | |
| 2006/0236642 A1 | 10/2006 | Pervan | WO | WO 98/38401 | 9/1998 | |
| 2006/0260254 A1 | 11/2006 | Pervan | WO | WO 99/66151 A1 | 12/1999 | |
| 2007/0006543 A1 | 1/2007 | Engstrom | WO | WO 99/66152 | 12/1999 | |
| 2007/0028547 A1 | 2/2007 | Grafenauer | WO | WO 99/66152 A1 | 12/1999 | |
| 2007/0151189 A1 | 7/2007 | Yang | WO | WO 00/20705 A1 | 4/2000 | |
| 2007/0175156 A1 | 8/2007 | Pervan et al. | WO | WO 00/20706 A1 | 4/2000 | |
| 2007/0209736 A1 | 9/2007 | Deringor et al. | WO | WO 00/47841 | 8/2000 | |
| 2008/0000185 A1 | 1/2008 | Duernberger | WO | WO 01/02670 A1 | 1/2001 | |
| 2008/0010931 A1 | 1/2008 | Pervan et al. | WO | WO 01/02672 | 1/2001 | |
| 2008/0028707 A1 | 2/2008 | Pervan | WO | WO 01/07729 A1 | 2/2001 | |
| 2008/0034708 A1 | 2/2008 | Pervan | WO | WO 01/51732 | 7/2001 | |
| 2008/0041008 A1 | 2/2008 | Pervan | WO | WO 01/53628 A1 | 7/2001 | |
| 2008/0066415 A1 | 3/2008 | Pervan | WO | WO 01/66877 | 9/2001 | |
| 2008/0104921 A1 | 5/2008 | Pervan et al. | WO | WO 01/75247 A1 | 10/2001 | |
| 2008/0110125 A1 | 5/2008 | Pervan | WO | WO 01/77461 A1 | 10/2001 | |
| 2008/0134607 A1 | 6/2008 | Pervan et al. | WO | WO 01/98604 A1 | 12/2001 | |
| 2008/0134613 A1 | 6/2008 | Pervan | WO | WO 02/055809 A1 | 7/2002 | |
| 2008/0216920 A1 | 9/2008 | Pervan | WO | WO 02/055810 A1 | 7/2002 | |
| 2008/0236088 A1 | 10/2008 | Hannig et al. | WO | WO 02/092342 A1 | 11/2002 | |
| 2008/0295432 A1 | 12/2008 | Pervan et al. | WO | WO 03/012224 A1 | 2/2003 | |
| 2009/0133353 A1 | 5/2009 | Pervan et al. | WO | WO 03/016654 A1 | 2/2003 | |
| 2009/0193748 A1 | 8/2009 | Pervan et al. | WO | WO 03/025307 | 3/2003 | |
| 2009/0308014 A1 | 12/2009 | Muehlebach | WO | WO 03/083234 A1 | 10/2003 | |
| 2010/0293879 A1 | 11/2010 | Pervan et al. | WO | WO 03/087497 | 10/2003 | |
| 2010/0300031 A1 | 12/2010 | Pervan et al. | WO | WO 03/089736 A1 | 10/2003 | |
| 2010/0319291 A1 | 12/2010 | Pervan et al. | WO | WO 2004/020764 A1 | 3/2004 | |
| 2011/0030303 A1 | 2/2011 | Pervan et al. | WO | WO 2004/079130 A1 | 9/2004 | |
| 2011/0041996 A1 | 2/2011 | Pervan | WO | WO 2004/083557 A1 | 9/2004 | |
| 2011/0088344 A1 | 4/2011 | Pervan et al. | WO | WO 2005/054599 A1 | 6/2005 | |
| 2011/0088345 A1 | 4/2011 | Pervan | WO | WO 2006/043893 A1 | 4/2006 | |
| 2011/0167750 A1 | 7/2011 | Pervan | WO | WO 2006/050928 A1 | 5/2006 | |
| 2011/0225922 A1 | 9/2011 | Pervan et al. | WO | WO 2006/104436 A1 | 10/2006 | |
| 2011/0252733 A1 | 10/2011 | Pervan et al. | WO | WO 2007/015669 A2 | 2/2007 | |
| 2011/0283650 A1 | 11/2011 | Pervan et al. | WO | WO 2007/079845 A1 | 7/2007 | |
| 2012/0174520 A1 | 7/2012 | Pervan | WO | WO 2007/089186 A1 | 8/2007 | |
| 2012/0279161 A1 | 11/2012 | HÅkansson et al. | WO | WO 2008/004960 A2 | 1/2008 | |
| | | | WO | WO 2008/004960 A8 | 1/2008 | |

FOREIGN PATENT DOCUMENTS

| | | | |
|---|---|---|---|
| | | | WO | WO 2008/060232 A1 | 5/2008 |
| DE | 2 159 042 A1 | 6/1973 | |
| DE | 3343601 | 6/1985 | |
| DE | 39 32 980 A1 | 11/1991 | |
| DE | 42 15 273 A1 | 11/1993 | |
| DE | 42 42 530 A1 | 6/1994 | |
| DE | 196 01 322 A1 | 5/1997 | |
| DE | 299 22 649 U1 | 4/2000 | |
| DE | 199 40 837 A1 | 11/2000 | |

OTHER PUBLICATIONS

U.S. Appl. No. 13/146,731, Pervan, et al.
U.S. Appl. No. 13/232,467, Pervan, et al.
U.S. Appl. No. 13/329,019, Pervan, et al.
Pervan, Darko, U.S. Appl. No. 13/146,731, entitled "Mechanical Lockings of Floor Panels and a Tongue Blank," filed in the U.S. Patent and Trademark Office on Oct. 13, 2011.

Pervan, Darko, U.S. Appl. No. 13/232,467, entitled "Mechanical Locking System for Panels and Method of Installing Same," filed in the U.S. Patent and Trademark Office on Sep. 14, 2011.

Pervan, Darko, et al., U.S. Appl. No. 13/329,019, entitled "Mechanical Locking of Building Panels," filed in the U.S. Patent and Trademark Office on Dec. 16, 2011.

*Complaint, Akzenta Paneele + Profile GmbH and W. Classen GmbH & Co. KG v. Brown-West L.L.C d/b/a Carpet One Floor & Home, Shaw Industries Group, Inc. and Valinge Innovation AB*, United States District Court for the Eastern District of Texas, Marshall Division, Case No. 2:10-CV-16, dated Jan. 14, 2010.

*Answer, Affirmative Defenses and Counterclaims of Defendant Välinge Innovation AB, Akzenta Paneele + Profile GmbH and W. Classen GmbH & Co. KG v. Brown-West L.L.C d/b/a Carpet One Floor & Home, Shaw Industries Group, Inc. and Välinge Innovation AB*, United States District Court for the Eastern District of Texas, Marshall Division, Case No. 2:10-CV-00016 (TWG)(CE), dated Apr. 9, 2010.

*Plaintiff's First Amended Complaint and Counterclaim on Reply, Akzenta Paneele + Profile GmbH and W. Classen GmbH & Co. KG v. Shaw Industries Group, Inc. and Välinge Innovation AB and Darko Pervan*, United States District Court for the Eastern District of Texas, Marshall Division, Case No. 2:10-CV-16, dated Nov. 30, 2010, and attachments thereto.

European prosecution file history, European Patent No. 1863984 (Appln. No. 06700664), dated Oct. 5, 2006 to Sep. 9, 2010.

*Shaw Industries Group, Inc.'s Answer, Defenses and Counterclaims to Plaintiffs' First Amended Complaint and Counterclaim on Reply, Akzenta Paneele + Profile GmbH, Akzenta Vertriebs GmbH and W. Classen GmbH & Co. KG v. Shaw Industries Group, Inc. and Välinge Innovation AB and Darko Pervan*, United States District Court for the Eastern District of Texas, Marshall Division, Case No. 2:10-CV-00016 (TJW)(CE), dated Jan. 7, 2011.

*Answer, Affirmative Defenses and Counterclaims of Defendant Välinge Innovation AB to Plaintiffs' First Amended Complaint and Counterclaim on Reply, Akzenta Paneele + Profile GmbH, Akzenta Vertriebs GmbH and W. Classen GmbH & Co. KG v. Shaw Industries Group, Inc. and Välinge Innovation AB and Darko Pervan*, United States District Court for the Eastern District of Texas, Marshall Division, Case No. 2:10-CV-00016 (TJW)(CE), dated Jan. 7, 2011.

Laminate Flooring Tips (http://flooring.lifetips.com/cat/61734/1aminate-flooring-tips/index.html), 12 pages Copyright 2000.

Engstrand, Ola, Välinge Innovation AB. va043 5G Linear Slide Tongue, IRN—ISSN 1533-0001 IP.com No. I PCOM000179015D Retrieved from: Epoquenet; Database XPIPCOM, Accession No. AN. XP013129255, Feb. 4, 2009.

Pervan, Darko, et al., U.S. Appl. No. 13/577,042, entitled "Mechanical Locking System for Floor Panels," filed in the U.S. Patent and Trademark Office on Aug. 3, 2012.

U.S. Appl. No. 13/540,107, Pervan.

U.S. Appl. No. 13/544,281, Pervan.

U.S. Appl. No. 13/546,569, Pervan.

U.S. Appl. No. 13/585,204, Pervan.

U.S. Appl. No. 13/585,485, Pervan.

U.S. Appl. No. 13/585,179, Pervan.

Pervan, Darko, U.S. Appl. No. 13/540,107, entitled "Mechanical Locking of Floor Panels with a Glued Tongue," filed in the U.S. Patent and Trademark Office on Jul. 2, 2012.

Pervan, Darko, U.S. Appl. No. 13/544,281, entitled "Mechanical Locking System for Floor Panels," filed in the U.S. Patent and Trademark Office on Jul. 9, 2012.

Pervan, Darko, et al., U.S. Appl. No. 13/546,569, entitled "Mechanical Locking System for Floor Panels," filed in the U.S. Patent and Trademark Office on Jul. 11, 2012.

Pervan, Darko, et al., U.S. Appl. No. 13/585,204, entitled "Mechanical Locking System for Floor Panels," filed in the U.S. Patent and Trademark Office on Aug. 14, 2012.

Pervan, Darko, et al., U.S. Appl. No. 13/585,485, entitled "Mechanical Locking System for Floor Panels," filed in the U.S. Patent and Trademark Office on Aug. 14, 2012.

Pervan, Darko, et al., U.S. Appl. No. 13/585,179, entitled, "Mechanical Locking System for Floor Panels," filed in the U.S. Patent and Trademark Office on Aug. 14, 2012.

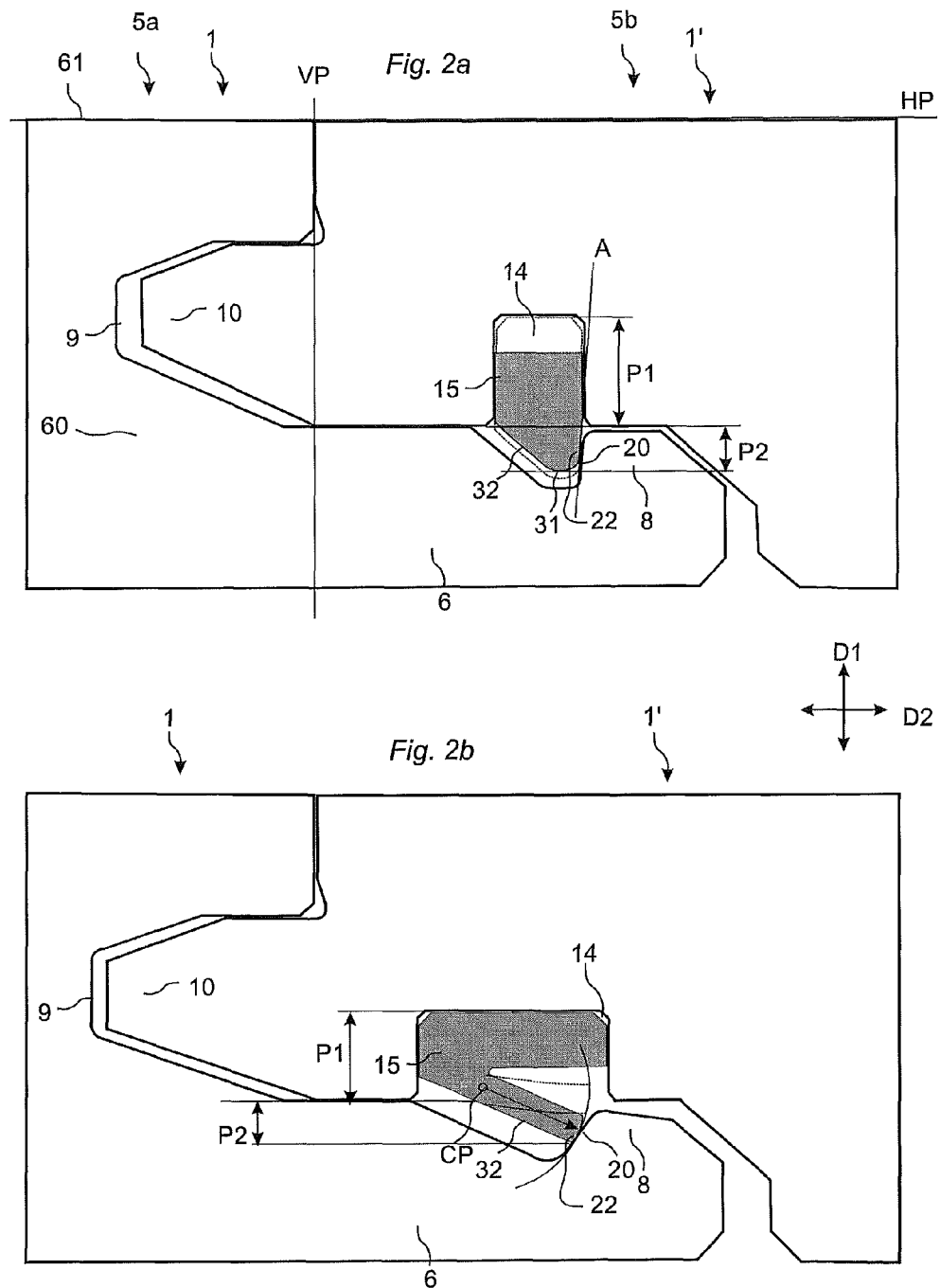

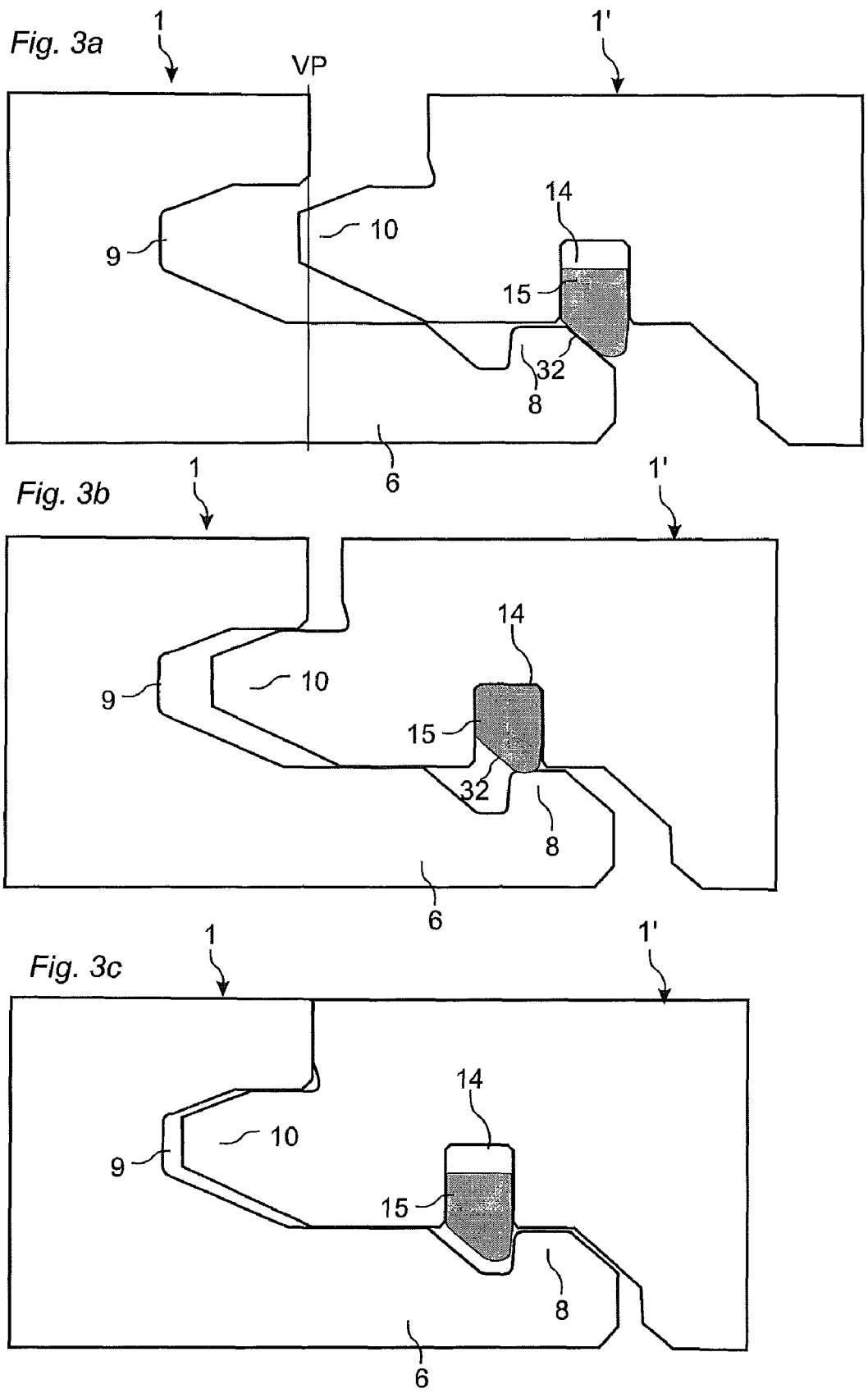

Fig. 6a
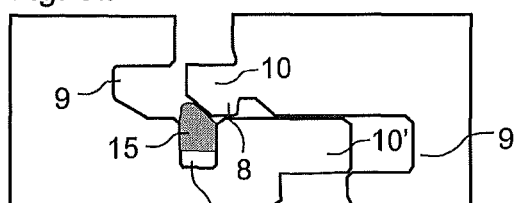 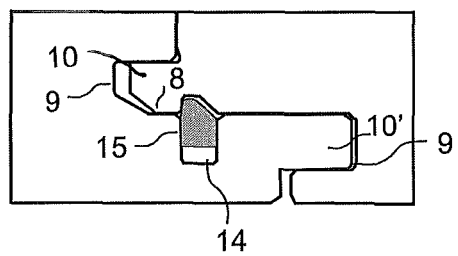
Fig. 6b
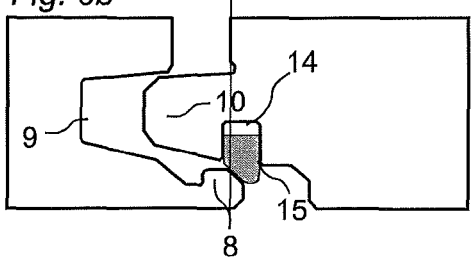 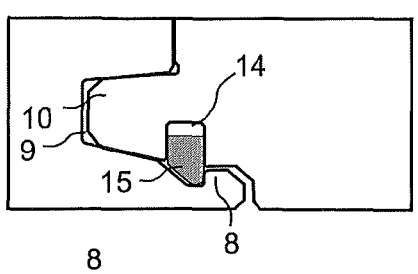
Fig. 6c
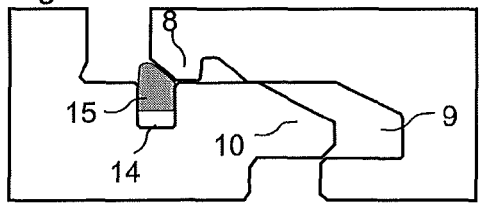 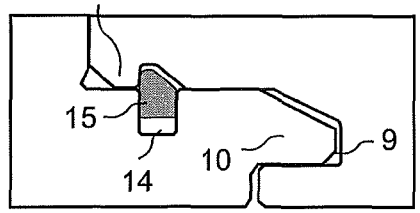
Fig. 6d
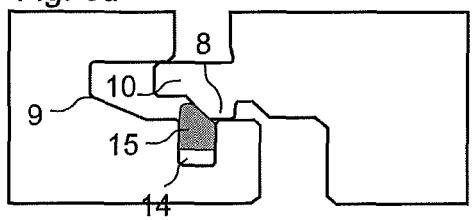 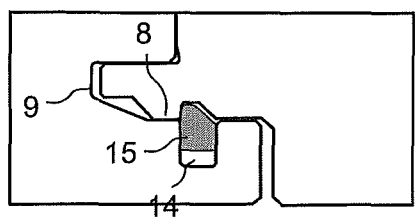
Fig. 6e
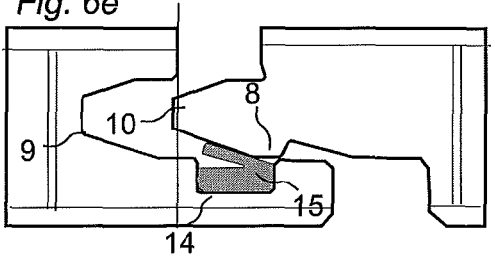 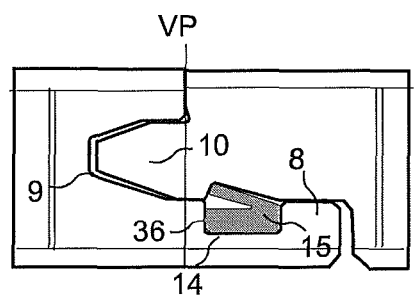

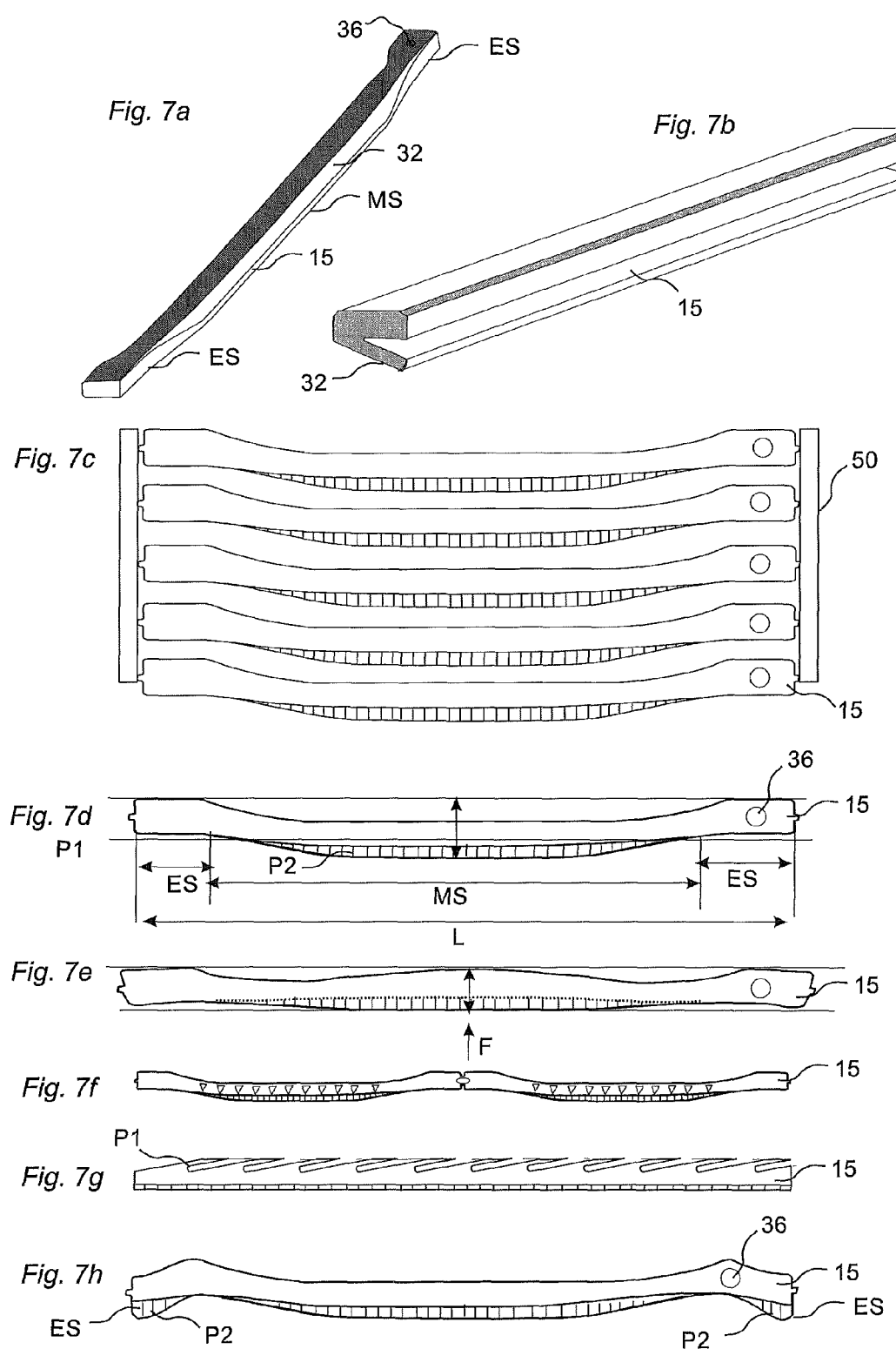

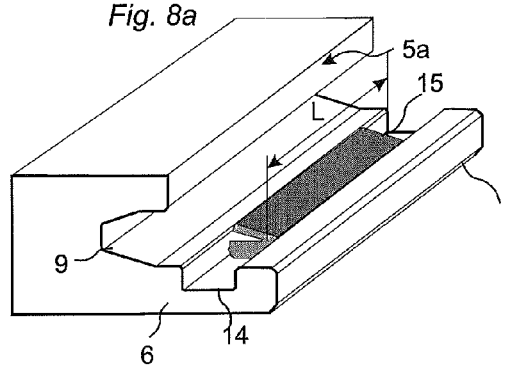
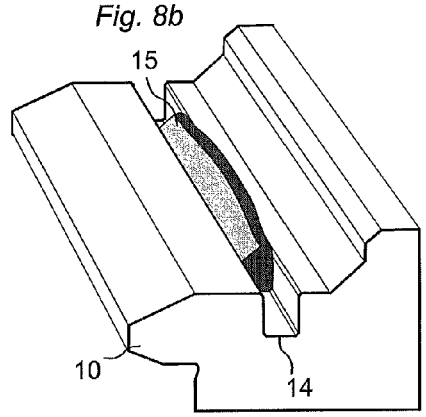
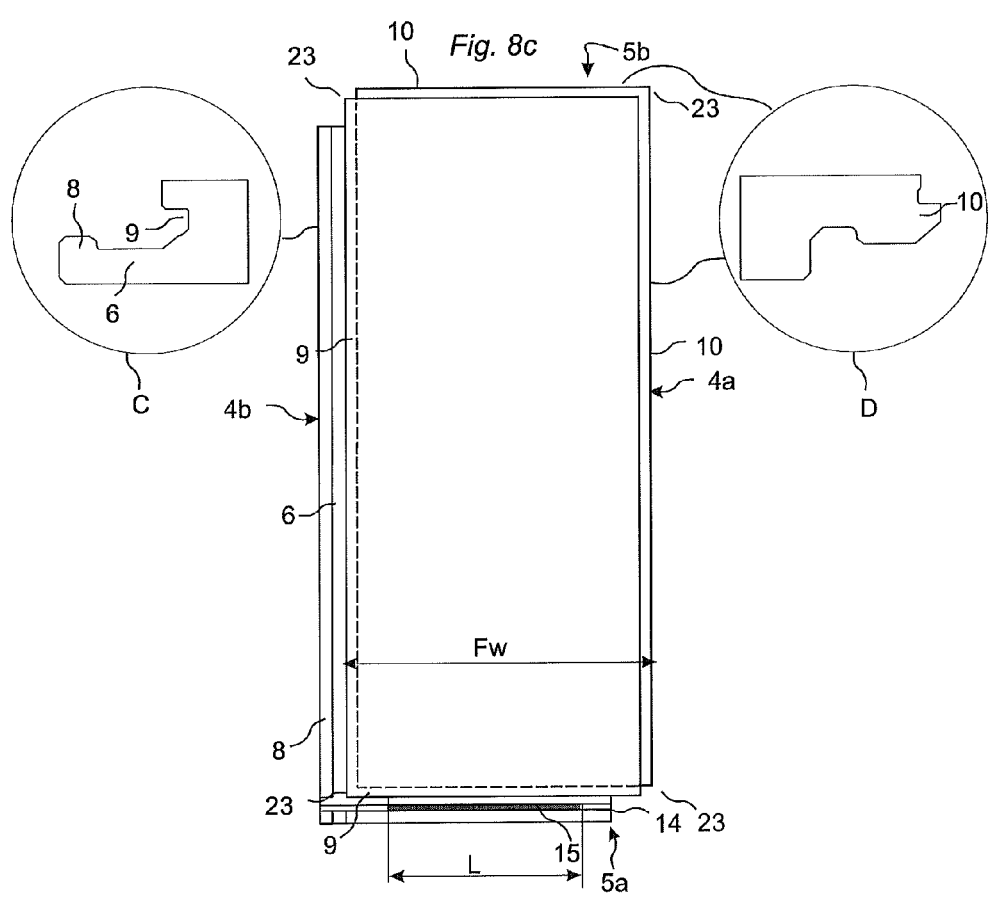

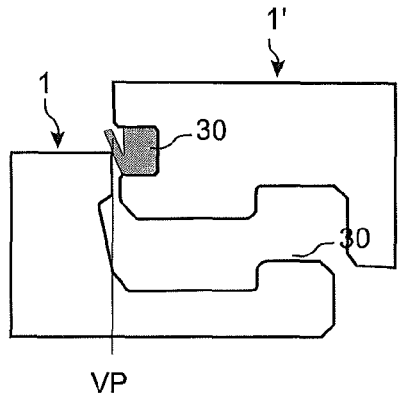
*Fig. 10a*
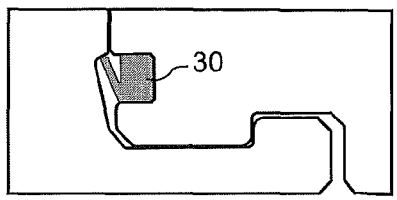
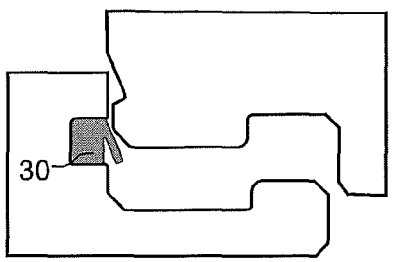
*Fig. 10b*
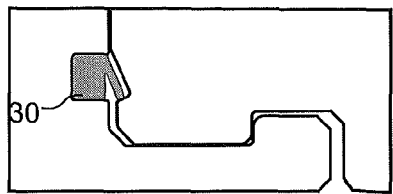
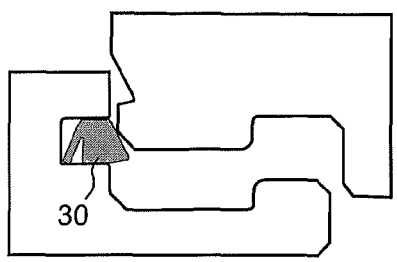
*Fig. 10c*
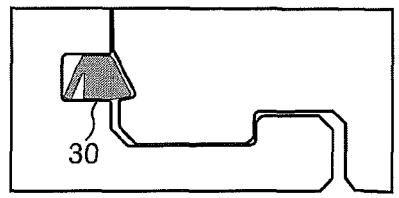
*Fig. 10d*
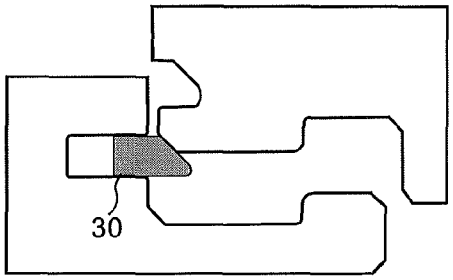
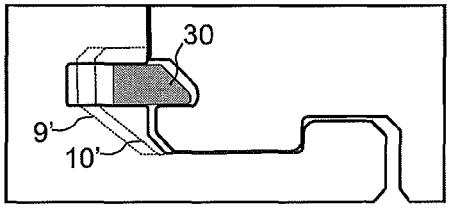

MECHANICAL LOCKING SYSTEM FOR FLOOR PANELS

CROSS REFERENCE TO RELATED APPLICATIONS

The present application is a continuation of U.S. application Ser. No. 12/962,341, filed on Dec. 7, 2010, which is a continuation of U.S. application Ser. No. 11/822,723, filed on Jul. 9, 2007, which is a continuation of U.S. application Ser. No. 11/092,748, filed on Mar. 30, 2005. The entire contents of each of U.S. application Ser. No. 12/962,341, U.S. application Ser. No. 11/822,723 and U.S. application Ser. No. 11/092,748 are hereby incorporated herein by reference.

TECHNICAL FIELD

The invention generally relates to the field of mechanical locking systems for floor panels and building panels.

FIELD OF APPLICATION OF THE INVENTION

The present invention is particularly suitable for use in floating floors, which are formed of floor panels which are joined mechanically with a locking system integrated with the floor panel, i.e. mounted at the factory, are made up of one or more upper layers of veneer, decorative laminate or decorative plastic material, an intermediate core of wood-fibre-based material or plastic material and preferably a lower balancing layer on the rear side of the core. The following description of prior-art technique, problems of known systems and objects and features of the invention will therefore, as a non-restrictive example, be aimed above all at this field of application and in particular laminate flooring formed as rectangular floor panels with long and shorts sides intended to be mechanically joined on both long and short sides. The long and shorts sides are mainly used to simplify the description of the invention. The panels could be square. It should be emphasized that the invention can be used in any floor panel and it could be combined with all types of known locking system, where the floor panels are intended to be joined using a mechanical locking system connecting the panels in the horizontal and vertical directions on at least two adjacent sides. The invention can thus also be applicable to, for instance, solid wooden floors, parquet floors with a core of wood or wood-fibre-based material and a surface of wood or wood veneer and the like, floors with a printed and preferably also varnished surface, floors with a surface layer of plastic or cork, linoleum, rubber. Even floors with hard surfaces such as stone, tile and similar are included and floorings with soft wear layer, for instance needle felt glued to a board. The invention can also be used for joining building panels which preferably contain a board material for instance wall panels, ceilings, furniture components and similar.

BACKGROUND OF THE INVENTION

Laminate flooring usually consists of a core of a 6-12 mm fibre board, a 0.2-0.8 mm thick upper decorative surface layer of laminate and a 0.1-0.6 mm thick lower balancing layer of laminate, plastic, paper or like material. A laminate surface consists of melamine impregnated paper. The most common core material is fibreboard with high density and good stability usually called HDF—High Density Fibreboard. Sometimes also MDF—Medium Density Fibreboard—is used as core.

Traditional laminate floor panels of this type have been joined by means of glued tongue-and-groove joints.

In addition to such traditional floors, floor panels have been developed which do not require the use of glue and instead are joined mechanically by means of so-called mechanical locking systems. These systems comprise locking means, which lock the panels horizontally and vertically. The mechanical locking systems are usually formed by machining of the core of the panel. Alternatively, parts of the locking system can be formed of a separate material, for instance aluminium or HDF, which is integrated with the floor panel, i.e. joined with the floor panel in connection with the manufacture thereof.

The main advantages of floating floors with mechanical locking systems are that they are easy to install. They can also easily be taken up again and used once more at a different location.

DEFINITION OF SOME TERMS

In the following text, the visible surface of the installed floor panel is called "front side", while the opposite side of the floor panel, facing the sub floor, is called "rear side". The edge between the front and rear side is called "joint edge". By "horizontal plane" is meant a plane, which extends parallel to the outer part of the surface layer. Immediately juxtaposed upper parts of two adjacent joint edges of two joined floor panels together define a "vertical plane" perpendicular to the horizontal plane.

By "locking systems" are meant co acting connecting means which connect the floor panels vertically and/or horizontally. By "mechanical locking system" is meant that joining can take place without glue. Mechanical locking systems can in many cases also be joined by gluing. By "integrated with" means formed in one piece with the panel or factory connected to the panel.

PRIOR-ART TECHNIQUE AND PROBLEMS THEREOF

For mechanical joining of long sides as well as short sides in the vertical and horizontal direction (direction D1, D2) several methods could be used. One of the most used methods is the angle-snap method. The long sides are installed by angling. The panel is than displaced in locked position along the long side. The shorts sides are locked by horizontal snapping as shown in FIGS. 1a-1c. The vertical connection is a tongue 10 and a groove 9. During the horizontal displacement, a strip 6 with a locking element 8 is bended and when the edges are in contact, the strip springs back and a locking element 8 enters a locking groove 14 and locks the panels horizontally. The vertical displacement of the locking element during the snapping action is caused by the bending of the strip. Such a snap connection is complicated since a hammer and a tapping block must be used to overcome the friction between the long edges and to bend the strip during the snapping action. The friction on the long side could be reduced and the panels could be displaced without tools. The snapping resistance is however considerable especially in locking systems made in one piece with the core. Wood based materials are generally difficult to bend. Cracks in the panel may occur during snapping and the locking element must be rather small in vertical direction in order to allow snapping.

It is known that a snap system could have a separate plastic strip 6', integrated with the panel and with a resilient part as shown in FIGS. 1d-1f. Such a locking system could be locked with less resistance than the traditional one-piece snap system. This locking system has however several disadvantages.

The plastic strip is used to replace both the tongue and the strip with a locking element. The material cost is therefore high and the locking system is generally not compatible with the locking system used in old panels. The groove 9 is difficult to produce since it must have a locking element 8'. In fact 4 locking elements, two flexible locking elements on the strip and two (8,8') in the panel, must be used to lock in the horizontal direction. It is difficult to fix the plastic strip over the whole length of the short side. This means that corner portions will not have any tongue and this could cause problems in some applications.

BRIEF DESCRIPTION OF THE INVENTION AND OBJECTS THEREOF

A first overall objective of the present invention is to provide a locking system, which could be locked by horizontal snapping and with less snapping resistance than the known prior art systems. The costs and functions should be favourable compared to known technology. An essential part of the overall objective is to improve the function and costs of those parts of the locking system that locks in the horizontal direction when panels are pushed against each other.

More specifically the object is to provide a snap locking system where one or several of the following advantages are obtained.

The floor panel should preferably be possible to displace and lock with such a low force that no tools will be needed.

The locking function should be reliable and the vertical and horizontal locking should be strong and prevent that two locked panels will move when humidity is changing or when people walk on a floor.

The locking system should be able to lock floor panels vertically with high precision so that the surfaces are essentially in the same plane.

The locking system should be designed in such a way that the material and production costs could be low.

A second objective is to provide a snap locking system which could be compatible with traditional locking systems.

The above objects of the invention are achieved wholly or partly by a locking systems and floor panels, according to the independent claim. Embodiments of the invention are evident from the dependent claims and from the description and drawings.

According to a first aspect of the invention, a flooring system is provided, comprising a plurality of rectangular floor panels with long and short edges, which are mechanically connectable to each other along one pair of adjacent edges. The floor panels are provided with tongue and groove formed in one piece with the panels for mechanically locking together said one pair of adjacent edges at right angles to the principal plane of the panels, thereby forming a vertical mechanical connections between the panels. The panels are provided with a first locking element at one first edge formed in one piece with the panel and a locking groove at an opposite adjacent second edge, the locking groove being open towards a rear side or a front side of the panel. Each panel is provided with a second locking element, formed of a separate material and connected to the locking groove. The first and second locking elements form a mechanical connection locking the panels to each other horizontally parallel to the principal plane and at right angles to the joint edges. The second locking element is flexible and resilient such that two panels, can be mechanically joined by displacement of said two panels horizontally towards each other, while at least a part of the second locking element at said second edges is resiliently displaced vertically, until said adjacent edges of the two panels are brought into engagement with each other horizontally and the second locking element at said second edge is displaced towards its initial position against the first locking element at the first edge.

Although it is an advantage to integrate the flexible locking element with the panel, the invention does not exclude an embodiment in which flexible locking elements are delivered as separate components to be connected to the panel by the installer prior to installation.

The invention allows horizontal and vertical locking of all sides of floor panels with for instance an angling of the long sides, a simple horizontal displacement along the long sides and snapping of the short sides. In this preferred embodiment the flexible locking element is on the short sides. It could be on the long side or on the long and short sides.

The invention is especially suited for use in floor panels, which are difficult to snap for example because they have a core, which is not flexible, or strong enough to form a strong snap locking system. The invention is also suitable for wide floor panels, for example with a width larger than 20 cm, where the high snapping resistance is a major disadvantage during installation, in panels where parts of the locking system is made of a material with high friction, such as wood and in locking systems which are produced with tight fit or without play or even with pretension. Especially panels with such pretension where the locking strip is bent in locked position and presses the panels together are very difficult to displace and snap. A locking system that reduces the snapping resistance will decrease the installation time of such panels considerably.

BRIEF DESCRIPTION OF THE DRAWINGS

FIGS. 2a-b Illustrate two embodiments of the invention
FIGS. 3a-c illustrate in several steps mechanical joining of floor panels according to the invention.
FIGS. 6a-e show embodiments of the invention.
FIGS. 7a-h show different embodiments of a flexible locking element.
FIGS. 8a-8c show locking systems on long and short side according to the invention.
FIGS. 10a-d show how the flexible locking element could be used as a flexible tongue enabling vertical connection.

DESCRIPTION OF EMBODIMENTS OF THE INVENTION

Figure 1A:
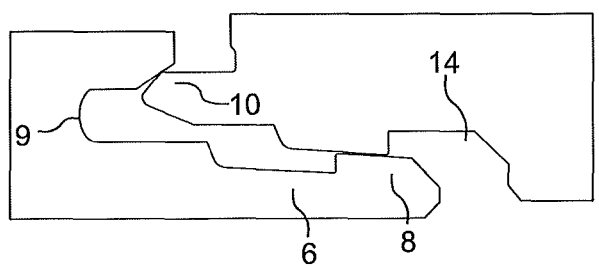
FIGS. 1a-f illustrate prior art.
Figure 1B:
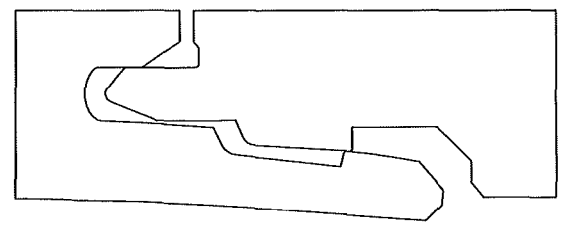
Figure 1C:
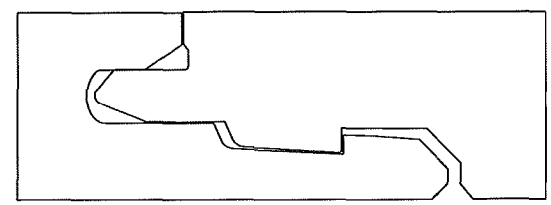
Figure 1D:
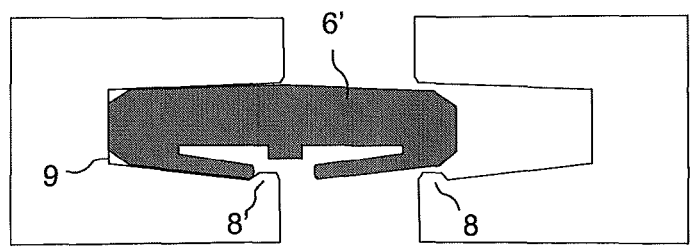
Figure 1E:
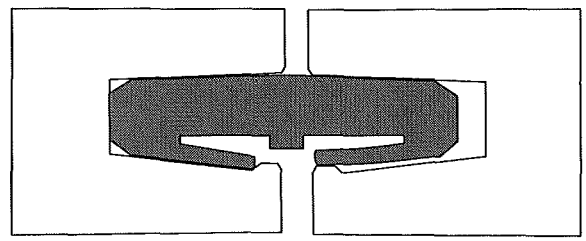
Figure 1F:
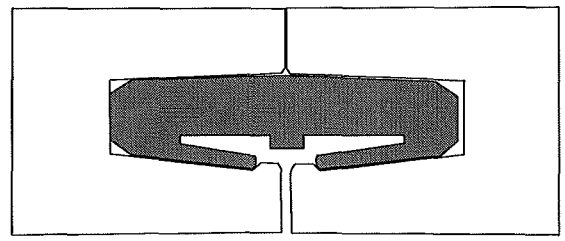

To facilitate understanding, several locking systems in the figures are shown schematically. It should be emphasized that improved or different functions can be achieved using combinations of the preferred embodiments. The inventor has tested all known and especially all commercially used locking systems on the market in all type of floor panels, especially laminate and wood floorings and the conclusion is that at least all these known locking systems which have one or more locking elements cooperating with locking grooves could be adjusted to a system with one ore more flexible locking elements according to the invention. Most of them could easily be adjusted in such a way that they will be compatible with the present systems. Several flexible locking elements could be located in both adjacent edges, one over the other or side-by-side. The flexible locking element could be on long and/or short sides and one side with a flexible locking element could be combined with another side which could have all known locking systems, preferably locking systems which could be locked by angling or a vertical movement. The invention does not exclude floor panels with flexible locking elements on for example a long and a short side. Such panels could be installed by the known snap—snap installation methods. The most preferable embodiment is however a floorboard with a surface layer of laminate, a core of HDF and a locking system with a flexible locking element on the short side allowing easy snapping combined with a one piece mechanical locking system on long side which could be locked by angling. The long side locking system could have a small play of some 0.01 mm between at least some surfaces which are active in the vertical or horizontal locking such as tongue/groove and or locking element/locking groove. This small play facilitates displacement. Such a floorboard will be very easy to install with angling and snapping. Angles, dimensions, rounded parts etc are only examples and could be adjusted within the principles of the invention.

A first preferred embodiment of a floor panel 1, 1' provided with a mechanical locking system according to the invention is now described with reference to FIGS. 2a-2b.

FIG. 2a illustrates schematically a cross-section of a joint preferably between a short side joint edge 5a of a panel 1 and an opposite short side joint edge 5b of a second panel 1'.

The front sides 61 of the panels are essentially positioned in a common horizontal plane HP, and the upper parts of the joint edges 5a, 5b abut against each other in a vertical plane VP. The mechanical locking system provides locking of the panels relative to each other in the vertical direction D1 as well as the horizontal direction D2.

To provide joining of the two joint edges in the D1 and D2 directions, the edges of the floor panel have in a manner known per se a locking strip 6 with a first locking element 8, and a groove 9 made in one piece with the panel in one joint edge 5a and a tongue 10 made in one piece with the panel at an opposite edge 5b. The tongue 10 and the groove 9 and provide the vertical locking D1.

The mechanical locking system according to the invention comprises a separate flexible second locking element 15 connected into a locking groove 14 formed in the opposite edge 5b of the panel. Parts of the flexible locking element could bend in the length direction and could be displaced in the locking groove. The flexible locking element 15 has a groove portion P1 that is located in the locking groove 14 and a projecting portion P2 projecting outside the locking groove 14. The projecting portion P2 of the second flexible locking element 15, made of a separate material, in one of the joint edges cooperates with a first locking element 8 made in one piece with the panel and formed in the other joint edge.

In this embodiment, the panel 1 could for example have a body or core 60 of wood-fibre-based material such as HDF, plywood or solid wood. The panels 1, 1' could also be made of stone, metal or ceramic materials. These materials are not flexible. The tongue 10 and/or the strip 6 with the locking element 8 could also be made of a separate material connected to the panel.

The flexible locking element 15 has a protruding part P2 with a rounded outer part 31 and a sliding surface 32 which in this embodiment if formed like a bevel.

The first locking element 8 has a first locking surface 20 which cooperates with the second locking surface 22 of the second flexible locking element 15 and locks the joint edges 5a, 5b in a horizontal direction D2. In this embodiment the locking surfaces 20,22 are slightly angled (A) against the vertical plane VP. The second locking element 15 will therefore lock as a wedge and tolerances cold be eliminated with vertical pre-tension caused by the vertical flexibility of the second flexible locking element.

FIG. 2b shows another embodiment. The inner part P1 of the flexible locking element 15 is fixed in the locking groove 14 and the protruding part P2 could flex vertically towards the locking groove 14 and the inner part P1 and back again towards the first locking element. In this embodiment the bending of the protruding part P2 takes place around a centre point CP. The locking surfaces 20,22 are formed such that they meet each other when the protruding part P2 snaps back towards its initial position.

FIGS. 3a-3c show how the flexible locking element 15 is displaced in the locking groove 14. The flexible locking element 15 is displaced vertically when the displacement surface 32 presses against the beveled part of the first locking element 8 as shown in FIG. 3a. When the top edges of the panels 1,1' are in contact or in the intended locked position, the flexible locking element 14 springs back and locks to the first locking element 8 as shown in FIG. 3c.

Figure 4A:
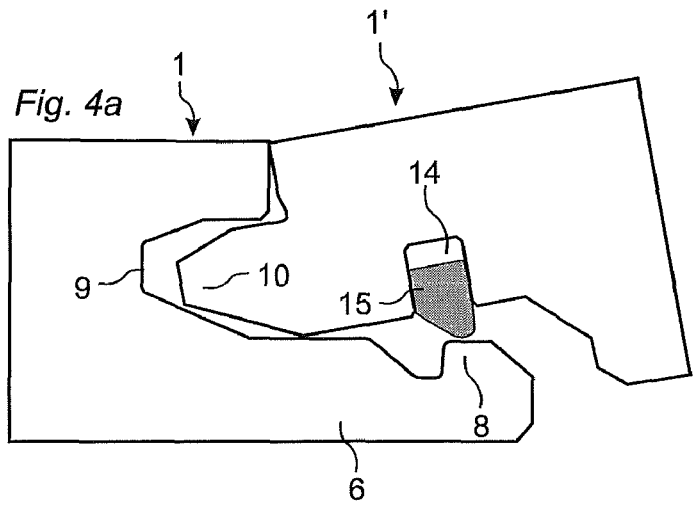
FIGS. 4a-d illustrate in several steps mechanical locking and unlocking of floor panels according to an embodiment of the invention.
Figure 4B:
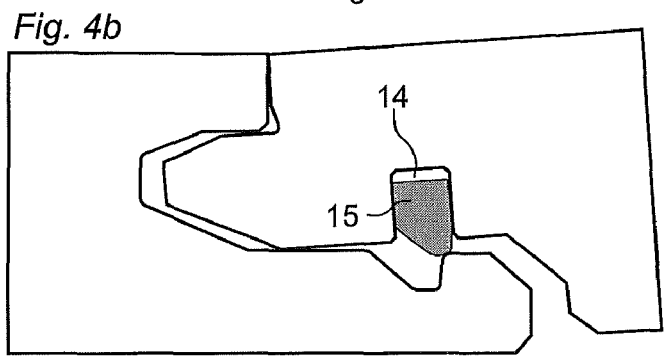
Figure 4C:
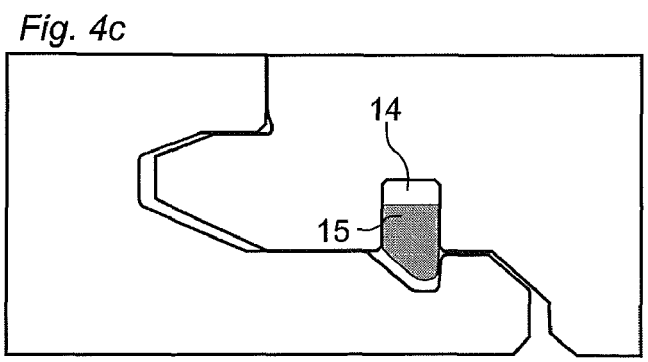
Figure 4D:
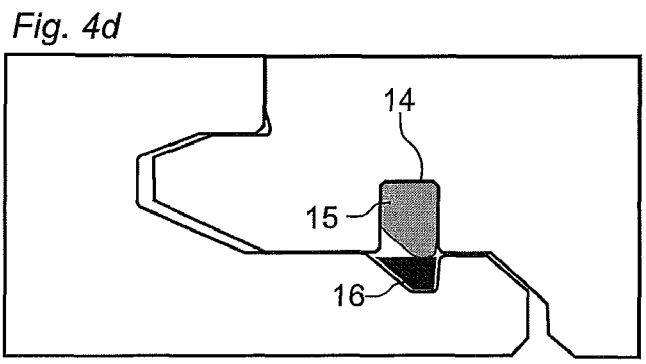

FIGS. 4a-4c show that a locking system with a flexible locking element 15 could also be locked and unlocked with angling. FIG. 4d show that a locking system with a flexible locking element could be unlocked with a needle shaped tool 16, which is inserted along the joint edge to push back the flexible locking element 14 and to unlock the locking system. Such an unlocking could be used to unlock panels which are installed in a herringbone pattern long side to short side with angling of short sides and snapping of short sides to long side.

Figure 5A:
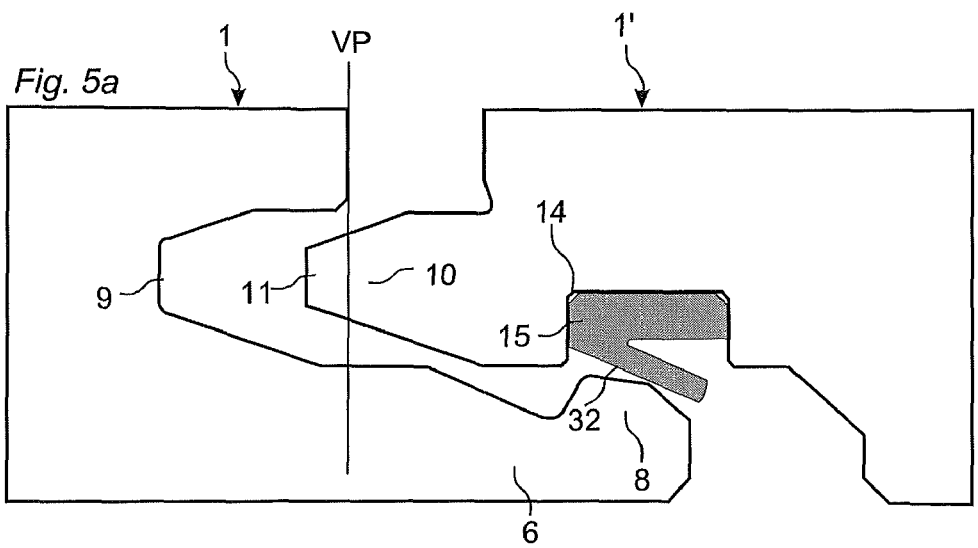
FIGS. 5a-c illustrate in several steps mechanical locking of floor panels according to another embodiment of the invention.
Figure 5B:
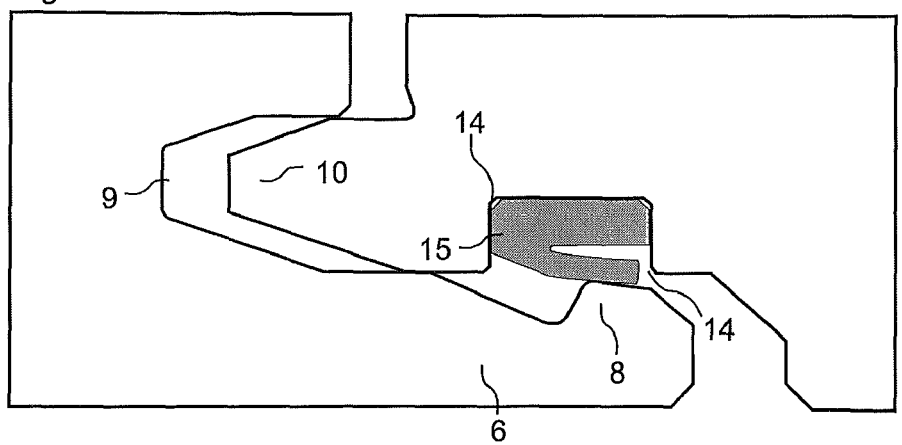
Figure 5C:
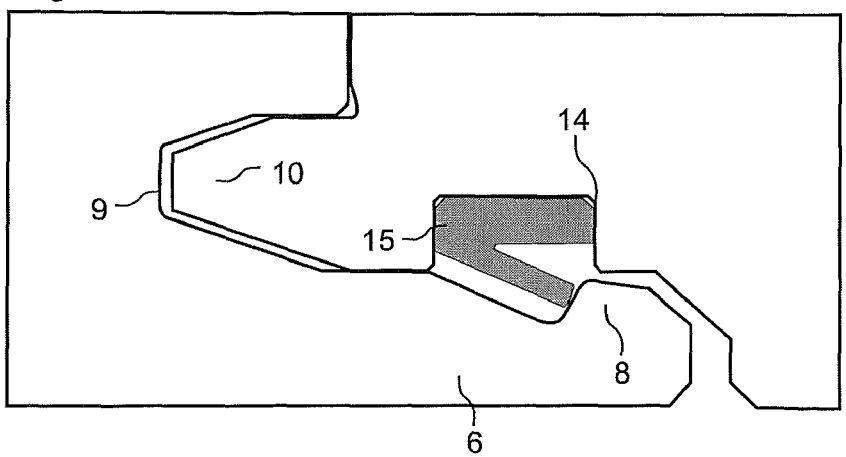
Figure 9A:
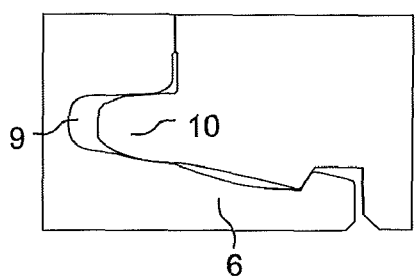
FIGS. 9a-i show how prior art locking systems could be converted to a locking system according to the invention.
Figure 9D:
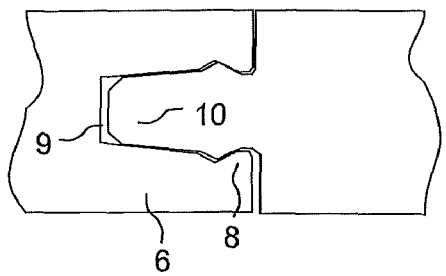
Figure 9B:
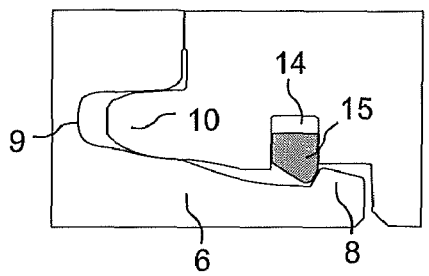
Figure 9E:
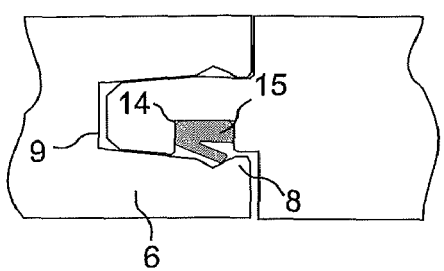
Figure 9C:
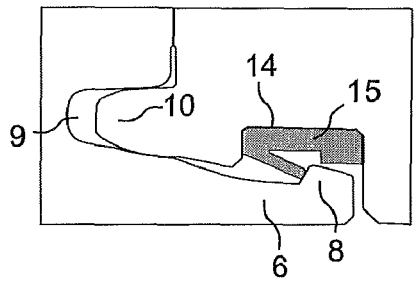
Figure 9F:
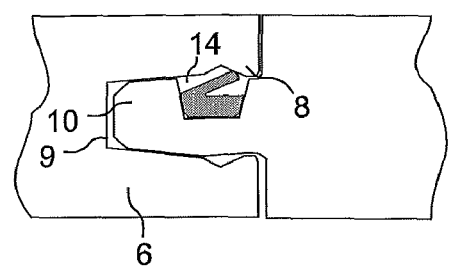
Figure 9G:
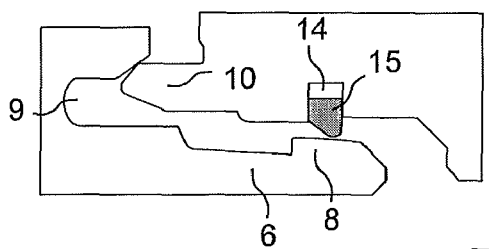
Figure 9H:
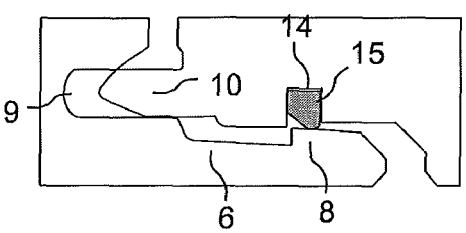
Figure 9I:
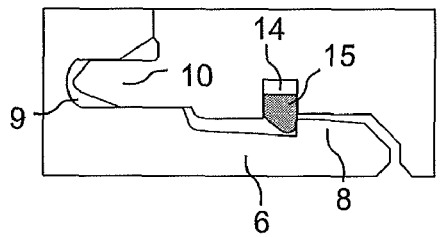

FIGS. 5a-5c shows locking according to the embodiment in FIG. 2b. It is an advantage if the tip 11 of the tongue 10 is partly in the groove 9 when the sliding surface 32 is in contact with the locking element 8. This facilitates snapping and installation of the panels.

FIGS. 6a-6e show different embodiments of the invention. FIG. 6a show a system with two tongues 10,10' and with a locking groove 14 open towards the front side. FIG. 6b shows a system with the locking groove partly in the part of the tongue 10 which is outside the vertical plane VP. FIGS. 6c and 6d are similar to 6a but these systems have only one tongue. FIG. 6e shows an embodiment according to FIG. 2b but with the locking groove open towards the front side. In this embodiment the floor panel is a parquet floor with a surface layer of wood and a lamella core. The flexible locking element 14 has a protrusion 36 to increase the friction between the flexible locking element 15 and the locking groove 14.

The flexible locking element 15 should preferably be connected to the locking groove with high precision, especially when parts of the flexible locking element 15 are displaced in the locking groove 14 during locking. Depending on the compressibility and friction between the flexible locking element and the locking groove, the flexible locking element as whole or different parts could be connected with a small play, for example 0.01-0.10 mm, a precise fit or a pre tension. Wax or other friction reducing materials or chemicals could be applied in the locking groove and/or between the locking elements.

Even with a play, a precise fit between the upper joint edges could be accomplished. The protruding part P2 could be formed to press against the locking surface 20 of the locking element 8. For example the protruding part P2 could be formed with a small angle to the vertical plane VP. The protruding part P2 of the flexible tongue will tilt and press the edges together. The flexible locking element 15 could be formed to cause a permanent pressure force vertically in the locked position. This means that the flexible locking element 15 will only partly spring back to the initial position. The flexible locking element could optionally be designed with such dimensions that after locking it will move slightly towards its initial position. Gradually a perfect connection will be accomplished.

FIGS. 7a-7h shows different embodiments of the flexible locking element 15. In FIG. 7a the flexible locking element 15 is moulded and has on one of the edge sections ES a friction connection 36 which could be shaped for instance as a local small protrusion. This friction connection keeps the flexible locking element in the locking groove 14 during installation, or during production, packaging and transport, if the flexible locking element is integrated with the floor panel at the factory. In FIG. 7b the flexible locking element 15 is an extruded plastic section.

FIG. 7c shows a blank 50 consisting of several flexible locking elements 15 connected to each other. In this embodiment the flexible locking element 15 is made with moulding, preferably injection moulding.

Any type of polymer materials could be used to produce the flexible locking elements such as PA (nylon), POM, PC, PP, PET or PE or similar having the properties described above in the different embodiments. These plastic materials could be reinforced with for instance glass fibre. A preferred material is glass fibre reinforced PA.

FIGS. 7d and 7e show a flexible locking element 15 with a length L, middle section MS and edge sections ES. This flexible locking element could bend in the length direction and the protruding part P2 could be displaced vertically in the locking groove if a force F is applied to the protruding part P2. FIG. 7e shows a double tongue 15. FIG. 7g shows an extruded section with a resilient punched inner part P1. FIG. 7h shows a flexible tongue 15 with protruding parts P2 at the edge sections ES.

With these production methods and basic principles a wide variety of complex two and three-dimensional shapes could be produced at low cost. Of course the flexible locking element 15 could be made from metal, preferably aluminium, but wood based sheet material such as HDF and compact laminate could also be used to form flexible locking elements with machining and punching and in combination with for example flexible rubber materials or similar.

FIGS. 8a-8c show how the flexible locking element 15 is connected to a groove 14 at a short side 5a of a floor panel. FIG. 8a shows an embodiment with a flexible tongue as shown in FIG. 7b and FIG. 8b shows an embodiment according to FIG. 7a. FIG. 8c shows a floor panel with a flexible locking element on the short sides 5a, 5b and an angling system C, D on the long sides 4a, 4b. Of course the long sides can also have one or several flexible locking elements. The flexible locking element 15 has in this embodiment a length L that is smaller than the width FL of the floor panel. As a non-restricting example it could be mentioned that sufficient locking strength could be achieved with a flexible locking element with a length L which is smaller than 0.8 times the floor width FW. Even a length L of 0.5 times FW could be sufficient. Such a flexible locking element could have a weight of about 1 gram and the material cost could be considerably lower than for other known technologies where separate materials are used. It is also very easy to connect to the locking element since it is not very important that the flexible locking element is connected at a precise distance from the corner portions 23. A further advantage is that the tongue 10 extends along essentially the whole short side as in traditional floor panels. This gives a strong vertical connection especially at the corner portions 23. Of course the flexible locking element could cover essentially the whole width FL.

The flexible locking element could be connected to the locking groove in several ways. A preferable method is that the flexible locking element is mechanically fixed. Of course glue or mechanical devices can also be used. To simplify the understanding the panel is located with its rear side up and the flexible locking element is on the short side. The panel could also be turned with the front side up. The flexible locking element is separated from blanks 50, if it is moulded, or from rolls if is extruded. It is then pressed or rolled into the locking groove when a short side of the panel is displaced under a fixing and the locking element is connected with friction. A lot of alternatives are possible within the main principles that the flexible locking element is separated and fixed with a friction force.

FIGS. 9a to 9i are examples which show that all known locking systems, especially traditional snap systems with a bendable strip (9a-9c or 9g-9i) or lip 6 9d-9f could be adjusted to a snap system with a flexible locking element 14 according to the invention. Generally only a simple adjustment of the locking groove is necessary. It could be made in the same machine and with the same number of cutting tools.

Figure 11:
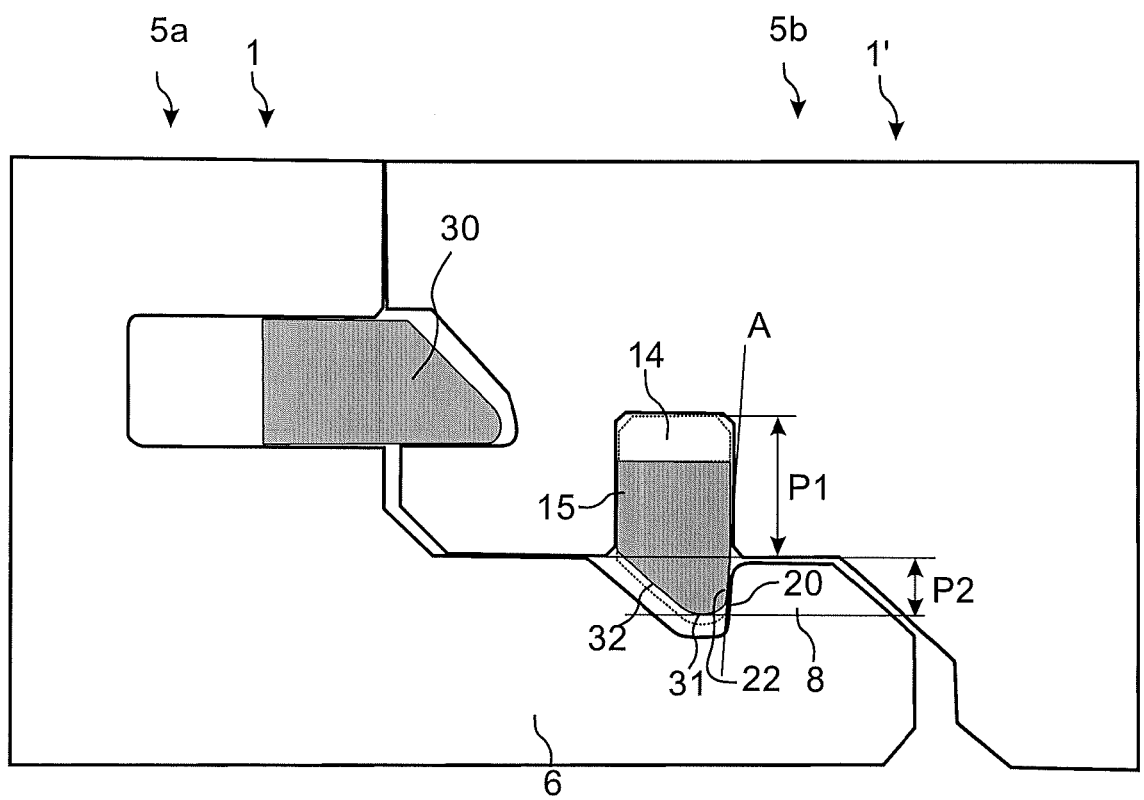
FIG. 11 illustrates an embodiment of a mechanical locking system including a flexible tongue, a first locking element and second locking element.

FIGS. 10a-10d show that the principles used in a locking system with a flexible locking element could also be used to replace the tongue 10 with a flexible tongue 30 in order to provide a locking system, which could be locked by vertical folding. One panel 1' could be moved along the vertical plane VP vertically towards another panel 1. The flexible tongue 30 is in this case displaced horizontally according to the same principles as described for the flexible locking element and all embodiments of the flexible locking element could be used. Of course the flexible locking element could be combined with a flexible tongue. One example of this combination is illustrated in FIG. 11, which shows panels having a flexible tongue 30 sand a second locking element 15. Such a locking system could be locked with angling, snapping and vertical folding. FIG. 10d show that it is an advantage if the flexible tongue 30 on a short side is position between the upper and lower parts of the tongue 10' and groove 9' on the long sides. This gives a stronger locking at the corner portions.

Within the invention a lot of alternatives are possible to accomplish snapping with a flexible locking element.

All features of the embodiment described above could be combined with each other or used separately. They could be used on long and/or short sides. The method to produce a separate locking element, which is inserted into a groove, could of course be used to improve friction properties and strength even if the locking element is not flexible or displaceable in the vertical direction. The methods and principle could also be used together with a flexible tongue that could be bent in horizontal direction during locking. The flexible locking element could also be combined with a strip 6 or lip which is partly bent during snapping. The degree of such a bending could be considerable smaller than in present known systems.

The system could be used to connect tile shaped panes installed on a wall and. The tiles could be connected to each other and to a locking member fixed to the wall.

The invention claimed is:

1. A flooring system, comprising a plurality of building panels with a hard surface, which are mechanically connectable to each other along one pair of adjacent joint edges, each floor panel being provided with a flexible tongue connected to a first groove at a first joint edge and second groove at a second opposite joint edge, said grooves are formed in one piece with the panels, for mechanically locking together said adjacent joint edges at right angles to a principal plane of the panels, the principal plane being parallel to the hard surface, thereby forming a vertical mechanical connection between the panels, said panels being provided with a first locking element at one of said first and second joint edges formed in one piece with the panel and a locking groove at an opposite first or second joint edge, the locking groove being open towards a rear side or a front side of the panel, wherein:

each panel being provided with a second locking element at the other of said first and second joint edges, formed of a separate material and connected to the locking groove, the first and second locking element form a mechanical connection locking the panels to each other horizontally parallel to the principal plane and at right angles to the joint edges, the second locking element is flexible and resilient such that two panels, can be mechanically joined by displacement of said two panels horizontally towards each other, while at least a part of the second locking element at said second edge is resiliently displaced vertically, until said adjacent edges of the two panels are brought into engagement with each other horizontally and the second locking element at said second edge is displaced towards its initial position against the first locking element at the first edge.

2. A flooring system as claimed in claim 1, wherein the locking groove is open towards the rear side of the panel.

3. A flooring system as claimed in claim 2, wherein immediately juxtaposed upper parts of two adjacent joint edges of two joined floor panels together define a vertical plane, wherein the first locking element is on a locking strip, which locking strip extends beyond the vertical plane.

4. A flooring system as claimed in claim 1, wherein the locking groove is open towards the front side of the panel.

5. A flooring system as claimed in claim 1, wherein the second locking element has a groove portion located in the locking groove and a projecting portion located outside the locking groove which are displaced towards each other when the panels are displaced horizontally.

6. A flooring system as claimed in claim 5, wherein the second locking element has a sliding surface at the projecting portion and wherein a tip of the flexible tongue is partly in the second groove when the sliding surface on the second locking element is in contact with the first locking element.

7. A flooring system as claimed in claim 1, wherein the displacement of the second locking element is not effected until a part of the flexible tongue is in the second groove.

8. A flooring system as claimed in claim 7, wherein a part of the second locking element is displaced in the locking groove.

9. A flooring system as claimed in claim 1, wherein the second locking element, along its length, has at least two sections and wherein the displacement of one of the sections is larger than the displacement of the other one of the sections.

10. A flooring system as claimed in claim 9, wherein said second locking element has a projecting portion which in connected state is located outside the locking groove and a groove portion in the locking groove, wherein the size of said projecting portion and/or the groove portion varies along the length of the flexible locking element.

11. A flooring system as claimed in claim 1, wherein the flexible locking element is spaced from a corner portion.

12. A flooring system as claimed in claim 1, wherein the second locking element and/or the flexible tongue is made of polymer material.

13. A flooring system as claimed in claim 12, wherein the second locking element and/or the flexible tongue is made of a moulded or extruded polymer material reinforced with glass fibre.

14. A flooring system as claimed in claim 12, wherein the polymer material is a thermoplastic material.

15. A flooring system as claimed in claim 1, wherein said mechanical connections for locking the panels to each other horizontally and vertically are configured to be locked by angling, snapping and vertical folding.

16. A flooring system as claimed in claim 1, wherein said hard surface is stone or tile.

\* \* \* \* \*